Patented May 29, 1934

1,960,459

UNITED STATES PATENT OFFICE 1,960,459

METHOD OF ORE SEPARATION

Joseph P. Ruth, Jr., Denver, Colo., assignor to The Ruth Company, Denver, Colo., a corporation of Colorado No Drawing. Application August 23, 1932, Serial No. 630,091

5 Claims. (Cl. 209—167)

This invention relates to improvements in methods of ore separation by differential flotation.

It is the object of this invention to produce a method for so treating ores containing both molybdenite and iron sulfides that the former can be floated in the presence of the latter. The ore is first ground to the point where the molybdenite is liberated from the quartz and the iron sulfide. The ore pulp may be filtered to remove any deleterious salts, after which it is repulped with deaerated water and conditioned with the chemicals that are considered most valuable for the purpose of inhibiting the iron sulfides in the absence of air, such as zinc cyanide. It may be conditioned with deaerated water in the presence of air; however, the best results are obtained where it is conditioned in the absence of air, the main requirement being the addition of deaerated water to the pulp and zinc cyanide which acts promptly and rapidly in the absence of air or oxygen in effectively coating and covering the iron sulfides, thus preventing their floating with the molybdenite. After this conditioning has been effected, aerating is usually very effective in removing the last traces of the cyanide used in the inhibiting step previously described. Thorough aerating seems to improve the quality of the molybdenite froth produced. However, it is not altogether essential. After this aeration period, the addition of ammonia is quite valuable since in an ammoniacal solution the oxides of molybdenite are dissolved, this action having a tendency to clean the molybdenum particles and at the same time depress the iron sulfides, since in an ammoniacal solution the oxides of iron pyrite, or the surface of the iron pyrite is additionally coated with some compound that renders it unattractive to the bubbles used in the floating of the molybdenite. I therefore add sufficient ammonia to bring about this condition. After the pulp has been subjected to a period of conditioning with ammonia, a satisfactory frother or collector is added to float the molybdenite, cresylic acid in this particular case being entirely satisfactory.

It may, in some cases, be of advantage to promote the molybdenite, first with ammonia before inhibiting since the cyanide compounds have little or no effect on molybdenite.

What I claim is:

1. In the flotation process of the separation of molybdenite from other sulfides, the step of inhibiting the sulfides with a cyanide compound and water from which the oxygen has been removed, promoting the molybdenum sulfide contained therein with ammonia, and floating the molybdenum sulfide relatively free from the other sulfides.

2. The method of separating molybdenite and iron sulfides by froth flotation which comprises adding zinc cyanide and water from which oxygen has been removed whereby the iron sulfides are inhibited, adding ammonia whereby the molybdenite is promoted and the iron pyrite is further inhibited, and subjecting to froth flotation separation whereby the molybdenite is removed.

3. The method of treating ores containing molybdenite and one or more sulfides to separate the molybdenite from the other sulfides which comprises, grinding the ore to a point where the molybdenite is liberated from the quartz and the other sulfides, conditioning with deaerated water and zinc cyanide, aerating to remove the cyanide, adding ammonia and subjecting to froth flotation separation whereby the molybdenite is removed.

4. In the method of separating molybdenum from one or more detrimental sulfides with which it occurs, the steps of, grinding the ore, conditioning it with deaerated water and a cyanide compound which will inhibit the deleterious sulfides, adding ammonia to promote the molybdenum, together with a frother and collector, and then subjecting the pulp to a froth flotation operation whereby the major portion of the molybdenite is removed, and the detrimental sulfides, which have been inhibited, remain in the pulp.

5. The method of separating molybdenite from iron sulfides by froth flotation which consists in, grinding the ore until the molybdenite is liberated, filtering to remove soluble deleterious salts, repulping with deaerated water, adding zinc cyanide for conditioning, aerating to remove the zinc cyanide, adding ammonia for cleaning the molybdenite and depressing the iron, adding a frother, and subjecting to a froth flotation treatment whereby the molybdenite will be removed.

JOSEPH P. RUTH, Jr.